(12) United States Patent
Wu

(10) Patent No.: US 12,432,721 B2
(45) Date of Patent: Sep. 30, 2025

(54) RESOURCE CONFIGURATION METHOD AND APPARATUS, TERMINAL DEVICE AND NETWORK DEVICE

(71) Applicant: GUANGDONG OPPO MOBILE TELECOMMUNICATIONS CORP., LTD., Dongguan (CN)

(72) Inventor: Zuomin Wu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 340 days.

(21) Appl. No.: 17/985,534

(22) Filed: Nov. 11, 2022

(65) Prior Publication Data

US 2023/0088011 A1 Mar. 23, 2023

Related U.S. Application Data

(63) Continuation of application No. PCT/CN2020/090112, filed on May 13, 2020.

(51) Int. Cl.
*H04W 72/12* (2023.01)
*H04W 72/044* (2023.01)
(Continued)

(52) U.S. Cl.
CPC ..... *H04W 72/1268* (2013.01); *H04W 72/044* (2013.01); *H04W 72/23* (2023.01); *H04W 74/0833* (2013.01)

(58) Field of Classification Search
CPC ........... H04W 72/1268; H04W 72/044; H04W 72/23; H04W 74/0833; H04W 74/0836;
(Continued)

(56) References Cited

U.S. PATENT DOCUMENTS 8,295,243 B2 * 10/2012 Malladi ............... H04W 74/002
455/450
9,363,829 B2 * 6/2016 Di Girolamo .... H04W 74/0808
(Continued)

FOREIGN PATENT DOCUMENTS

| CN | 109644173 A | 4/2019 |
|---|---|---|
| CN | 109716702 A | 5/2019 |

(Continued)

OTHER PUBLICATIONS

International Search Report issued in corresponding International Application No. PCT/CN2020/090112, mailed Feb. 5, 2021, 4 pages.

(Continued)

*Primary Examiner* — Wutchung Chu
(74) *Attorney, Agent, or Firm* — BAYES PLLC

(57) ABSTRACT

A resource configuration method comprises that a terminal device receives configuration information corresponding to an uplink bandwidth part (BWP) sent by a network device, the uplink BWP comprising at least two resource block (RB) sets; the terminal device acquires the frequency domain positions of a first frequency domain resource and N second frequency domain resources in the uplink BWP according to the configuration information, wherein the first frequency domain resource comprises a first guard band between two adjacent RB sets of the at least two RB sets, each of the N second frequency domain resources is used to transmit a first physical uplink channel, and each first physical uplink channel comprises at least one of a physical random access channel (PRACH) and a message A-physical uplink shared channel (msgA-PUSCH), wherein N is a positive integer.

18 Claims, 8 Drawing Sheets

(51) Int. Cl.
*H04W 72/1268* (2023.01)
*H04W 72/23* (2023.01)
*H04W 74/0833* (2024.01)

(58) Field of Classification Search
CPC ......... H04W 72/0453; H04W 72/0457; H04W 72/232; H04W 74/0808; H04L 5/0053; H04L 5/0098; H04L 5/001; H04L 5/0094
See application file for complete search history.

(56) References Cited

U.S. PATENT DOCUMENTS

| | | | |
|---|---|---|---|
| 9,967,802 B2* | 5/2018 | Malladi | H04L 5/0053 |
| 9,992,800 B2* | 6/2018 | Yerramalli | H04L 5/0026 |
| 10,231,165 B2* | 3/2019 | Vajapeyam | H04W 40/244 |
| 10,383,150 B2* | 8/2019 | Babaei | H04W 24/08 |
| 10,575,338 B2* | 2/2020 | Park | H04W 74/006 |
| 11,057,935 B2* | 7/2021 | Jeon | H04W 74/0833 |
| 2017/0231011 A1* | 8/2017 | Park | H04W 74/0841 |
| 2017/0332409 A1* | 11/2017 | Yerramalli | H04L 5/0026 |
| 2017/0332410 A1* | 11/2017 | Babaei | H04W 72/0446 |
| 2018/0124626 A1* | 5/2018 | Tsai | H04W 24/10 |
| 2019/0132882 A1* | 5/2019 | Li | H04L 27/2605 |
| 2019/0342874 A1 | 11/2019 | Davydov et al. | |
| 2020/0112484 A1 | 4/2020 | Sun et al. | |
| 2021/0051733 A1* | 2/2021 | Lee | H04B 7/0619 |
| 2021/0329703 A1* | 10/2021 | Yang | H04B 17/318 |
| 2022/0015156 A1* | 1/2022 | Xu | H04L 5/0051 |
| 2022/0174753 A1* | 6/2022 | Shin | H04L 27/26025 |
| 2022/0191941 A1* | 6/2022 | Lee | H04W 72/23 |
| 2022/0201763 A1* | 6/2022 | Lee | H04W 74/006 |
| 2022/0210751 A1* | 6/2022 | Lee | H04W 74/0833 |
| 2022/0210843 A1* | 6/2022 | Lee | H04W 74/006 |
| 2022/0248475 A1* | 8/2022 | Lee | H04W 72/1268 |
| 2022/0394777 A1* | 12/2022 | Ahn | H04L 5/0055 |
| 2024/0049287 A1* | 2/2024 | Lee | H04W 74/0833 |

FOREIGN PATENT DOCUMENTS

| | | | | |
|---|---|---|---|---|
| CN | 110167159 A | 8/2019 | | |
| CN | 110536437 A | 12/2019 | | |
| CN | 110730510 A | 1/2020 | | |
| EP | 3993550 A1 | 5/2022 | | |
| EP | 4145928 B1 | 8/2024 | | |
| RU | 2699407 C1 | 9/2019 | | |
| WO | WO-2015174748 A1 * | 11/2015 | ......... | H04L 27/2601 |
| WO | 2016119132 A1 | 8/2016 | | |
| WO | 2020032742 A1 | 2/2020 | | |
| WO | 2020056609 A1 | 3/2020 | | |
| WO | WO-2020253529 A1 * | 12/2020 | ............ | H04W 24/02 |
| WO | WO-2021066595 A1 * | 4/2021 | ....... | H04L 27/26025 |
| WO | WO-2021226898 A1 * | 11/2021 | ............. | H04L 5/001 |

OTHER PUBLICATIONS

Written Opinion of the International Searching Authority issued in International application No. PCT/CN2020/090112, mailed Feb. 5, 2021, 9 pages.

"Summary of email discussion [100b-e-NR-unlic-NRU-WB-01] on RB set", Agenda Item: 7.2.2.2.5, Source: Moderator (LG Electronics), 3GPP TSG RAN WG1 #100bis, R1-2002754, e-Meeting, Apr. 20-30, 2020, 27 pages.

"Running RRC CR for NR-U", Source to WG: Rapporteur (Qualcomm Incorporated), 3GPP TSG-RAN2#109e, R2-201254, Feb. 24-Mar. 6, 2020, 114 pages.

First Office action issued in corresponding Russian Application No. 2022132100, mailed on Oct. 3, 2023, 6 pages.

Communication pursuant to Article 94(3) EPC, issued in corresponding European Application No. 20936066.8, mailed on Oct. 27, 2023, 6 pages.

First Office Action issued in corresponding Indian application No. 202227069491, mailed Feb. 6, 2023.

Extended European Search Report issued in corresponding European application No. 20936066.8, mailed Mar. 31, 2023.

ZTE et al., "On the remaining issues of msgA channel structure", R1-1908181, 3GPP TSG RAN WG1 #98 Prague, CZ, Aug. 26-30, 2019.

ZTE, "FL Summary #2 of Channel Structure for Two-step RACH", R1-1909860, 3GPP TSG RAN WG1 #98 Prague, CZ, Aug. 26-30, 2019.

First Office action issued in corresponding Japanese Application No. 2022-568989, mailed Jan. 19, 2024.

Notice of Allowance issued in corresponding Russian Application No. 2022132100, mailed Feb. 1, 2024.

Source: LG Electronics; Title: Wide-band operation for NR-U 3GPP TSG RAN WG1 #98bis R1-1910823 Chongqing, China, Oct. 14-20, 2019.

Source: ZTE; Title: RRC parameters for Rel-16 NR 2-step RACH 3GPP TSG RAN WG1 #98 R1-1911582 Chongqing, China, Oct. 14-20, 2019.

Notice of Allowance issued in corresponding European application No. 20936066.8, mailed Apr. 29, 2024.

Notice of Allowance issued in corresponding Japanese application No. 2022-568989, mailed May 28, 2024.

Priority Review issued in corresponding Chinese application No. 202310144787.8, mailed May 30, 2024.

First Office Action issued in corresponding Chinese application No. 202310144787.8, mailed May 31, 2024.

Source: LG Electronics; Title: Wide-band operation for NR-U 3GPP TSG RAN WG1 #99 R1-1912393 Reno, USA, Nov. 18-22, 2019.

Source: LG Electronics; Title: Physical layer design of UL signals and channels for NR-U 3GPP TSG RAN WG1 #99 R1-1912388 Reno, USA, Nov. 18-22, 2019.

Notification to Grant Patent Right for Invention issued in corresponding Chinese Application No. 202310144787.8, dated Aug. 28, 2024, 5 pages.

First Office Action issued in corresponding Vietnamese Application No. 1-2022-07906, dated Sep. 11, 2024, 3 pages.

Hearing Notice issued in corresponding India Application No. 202227069491, mailed on Feb. 28, 2025. 2 pages.

Request for a Submission of an Opinion issued in corresponding Korean Application No. 10-2022-7039877, mailed on May 29, 2025, 9 pages.

Remaining issues for UL transmission for NR-U, Agenda Item: 7.2.2.1.3, Source: Lenovo, Motorola Mobility, 3GPP TSG RAN WG1 #100bis R1-2001973, E-meeting, Apr. 20-30, 2020, 6 pages.

* cited by examiner

RESOURCE CONFIGURATION METHOD AND APPARATUS, TERMINAL DEVICE AND NETWORK DEVICE

CROSS-REFERENCE TO RELATED APPLICATION

The present application is a continuation of International Application No. PCT/CN2020/090112, filed on May 13, 2020, which is incorporated herein by reference in its entirety.

TECHNICAL FIELD

The present disclosure relates to the field of communication technologies, and in particular, to a resource configuration method and apparatus, terminal device and network device.

BACKGROUND

In the standard protocol of the 3rd Generation Partnership Project (3GPP), the content of the protocol considers a new radio based access to unlicensed spectrum (NR-U) system deployed on the unlicensed spectrum.

In the NR-U system, due to the introduction of guard bands in the carrier, when an uplink BWP includes multiple RB sets, the uplink broadband part (BWP) may also include guard bands between two resource block (RB) sets.

SUMMARY

The embodiments of the present disclosure provide a resource configuration method and apparatus, a terminal device, and a network device.

In a first aspect, an embodiment of the present disclosure provides a resource configuration method, including:
  receiving, by a terminal device, configuration information corresponding to an uplink bandwidth part BWP sent by a network device, wherein the uplink BWP includes at least two resource block RB sets; and
  obtaining, by the terminal device according to the configuration information, frequency domain positions of a first frequency domain resource and N second frequency domain resource(s) in the uplink BWP, wherein the first frequency domain resource includes a first guard band between two adjacent RB sets in the at least two RB sets, each second frequency domain resource in the N second frequency domain resource(s) is used to transmit a first physical uplink channel, the first physical uplink channel includes at least one of physical random access channel PRACH and message A-physical uplink shared channel msgA-PUSCH, and N is a positive integer.

In a second aspect, an embodiment of the present disclosure provides a resource configuration method, including:
  transmitting, by a network device, configuration information corresponding to an uplink bandwidth part BWP to a terminal device, wherein the uplink BWP includes at least two resource block RB sets.

In a third aspect, an embodiment of the present disclosure provides an apparatus for resource configuration, applied to a terminal device including a processing unit and a communication unit, wherein the processing unit is configured to:
  receive configuration information corresponding to an uplink bandwidth part BWP sent by a network device, wherein the uplink BWP includes at least two resource block RB sets; and
  obtain, according to the configuration information, frequency domain positions of a first frequency domain resource and N second frequency domain resource(s) in the uplink BWP, wherein the first frequency domain resource includes a first guard band between two adjacent RB sets in the at least two RB sets, each second frequency domain resource in the N second frequency domain resource(s) is used to transmit a first physical uplink channel, the first physical uplink channel includes at least one of physical random access channel PRACH and message A-physical uplink shared channel msgA-PUSCH, and N is a positive integer.

In a fourth aspect, an embodiment of the present disclosure provides an apparatus for resource configuration, applied to a network device including a processing unit and a communication unit, wherein the processing unit is configured to:
  transmit configuration information corresponding to an uplink bandwidth part BWP to a terminal device, wherein the uplink BWP includes at least two resource block RB sets.

In a fifth aspect, an embodiment of the present disclosure provides a terminal device, including a processor, a memory, a communication interface, and one or more programs, wherein the one or more programs are stored in the memory and configured to be executed by the processor, and wherein the program includes instructions for implementing steps of any one of the method according the first aspect of the embodiments of the present disclosure.

In a sixth aspect, an embodiment of the present disclosure provides a network device, including a processor, a memory, a communication interface, and one or more programs, wherein the one or more programs are stored in the memory and configured to be executed by the processor, and wherein the program includes instructions for implementing steps of any one of the method according the second aspect of the embodiments of the present disclosure.

In a seventh aspect, an embodiment of the present disclosure provides a chip, including a processor, configured to invoke and execute a computer program from a memory, to cause a device on which the chip is installed to implement all or part of the steps of any one of the method according to the first aspect or the second aspect of the embodiments of the present disclosure.

In an eighth aspect, an embodiment of the present disclosure provides a computer-readable storage medium, configured to store a computer program for electronic data exchange, wherein the computer program causes a computer to implement all or part of the steps of any one of the method according to the first aspect or the second aspect of the embodiments of the present disclosure.

In a ninth aspect, an embodiment of the present disclosure provides a computer program configured to causes a computer to implement all or part of the steps of any one of the method according to the first aspect or the second aspect of the embodiments of the present disclosure. The computer program may be a software installation package.

BRIEF DESCRIPTION OF THE DRAWINGS

Hereinafter, the accompanying drawings that are required to be used in the description of the embodiments or the prior art will be briefly introduced.

DETAILED DESCRIPTION

Figure 1A:
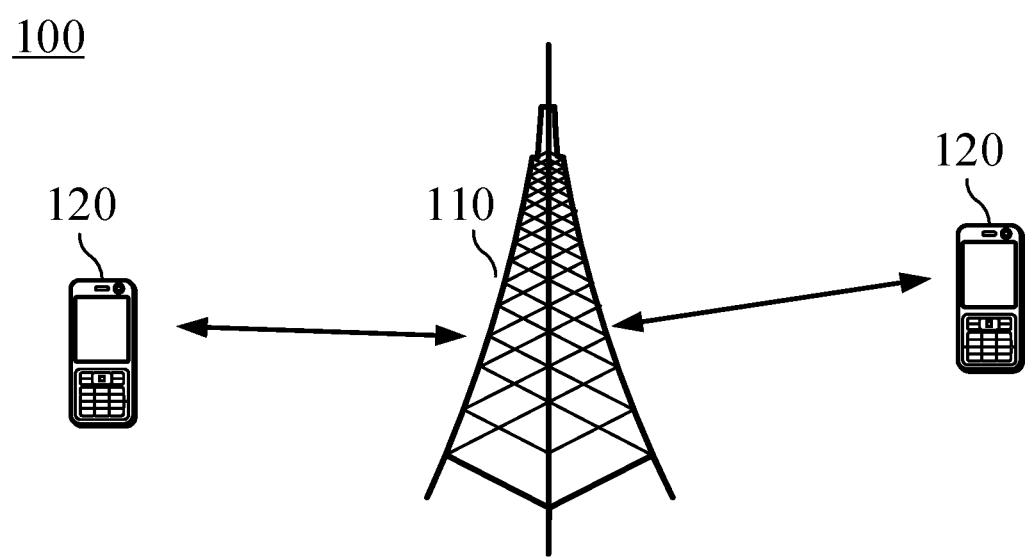
FIG. 1A is a system architecture diagram of an exemplary communication system provided by an embodiment of the present disclosure.

Hereinafter, the technical solutions in the embodiments of the present disclosure will be described below with reference to the accompanying drawings in the embodiments of the present disclosure. Obviously, the described embodiments are part of the embodiments of the present disclosure, not all of the embodiments. With regard to the embodiments in the present disclosure, all other embodiments obtained by persons of ordinary skill in the art without creative efforts shall fall within the protection scope of the present disclosure.

The technical solutions of the embodiments of the present disclosure can be applied to various communication systems, for example, a Global System of Mobile communication (GSM) system, a Code Division Multiple Access (CDMA) system, a Wideband Code Division Multiple Access (WCDMA) system, General Packet Radio Service (GPRS), Long Term Evolution (LTE) system, Advanced Long Term Evolution (LTE-A) system, New Radio (NR) system, evolution system of NR system, LTE-based access to unlicensed spectrum (LTE-U) system, NR-based access to unlicensed spectrum (NR-U) system, Non-Terrestrial Networks (NTN) system, Universal Mobile Telecommunication System (UMTS), Wireless Local Area Networks (WLAN), Wireless Fidelity (WiFi), fifth-generation communication (5th-Generation, 5G) system or other communication systems, etc.

Generally speaking, traditional communication systems support a limited number of connections and are easy to implement. However, with the development of communication technology, mobile communication systems will not only support traditional communication, but also support, for example, device to device (D2D) communication, machine to machine (M2M) communication, machine type communication (MTC), vehicle to vehicle (V2V) communication, or vehicle to everything (V2X) communication, etc., the embodiments of the present disclosure can also be applied to these communication systems.

Optionally, the communication system in this embodiment of the present disclosure may be applied to a carrier aggregation (CA) scenario, a dual connectivity (DC) scenario, or a standalone (SA) deployment web scene.

Optionally, the communication system in the embodiment of the present disclosure may be applied to an unlicensed spectrum, wherein the unlicensed spectrum may also be considered as a shared spectrum. Alternatively, the communication system in the embodiment of the present disclosure may also be applied to a licensed spectrum, wherein the licensed spectrum can also be considered unshared spectrum.

The embodiments of this disclosure describe various embodiments in conjunction with network device and terminal device, where terminal device may also be referred to as user equipment (UE), access terminal, subscriber unit, subscriber station, mobile set, mobile station, remote station, remote terminal, mobile device, user terminal, terminal, wireless communication device, user agent or user device, etc.

The terminal device can be a station (ST) in a WLAN, it can be a cellular phone, a cordless phone, a session initiation protocol (SIP) phone, a wireless local loop (WLL) station, a personal digital processor (PDA) device, a handheld device with wireless communication capabilities, a computing device or other processing devices connected to wireless modems, in-vehicle devices, wearable devices, end devices in next-generation communication systems such as NR networks, or a terminal equipment in a future evolved public land mobile network (PLMN) network, etc.

In this embodiment of the present disclosure, the terminal device can be deployed on land, including indoor or outdoor, handheld, wearable, or vehicle-mounted. It can also be deployed on water (such as ships, etc.). It can also be deployed in the air (such as airplanes, balloons, and satellites).

In this embodiment of the present disclosure, the terminal device may be a mobile phone (mobile phone), a tablet computer (Pad), a computer with a wireless transceiver function, a virtual reality (VR) terminal device, and an augmented reality (AR) terminal device, wireless terminal device in industrial control, wireless terminal device in self driving, wireless terminal device in remote medical, wireless terminal device in smart grid, wireless terminal device in transportation safety, wireless terminal device in smart city or wireless terminal device in smart home, etc.

As an example and not a limitation, in this embodiment of the present disclosure, the terminal device may also be a wearable device. Wearable devices can also be called wearable smart devices, which are the general term for the intelligent design of daily wear and the development of wearable devices using wearable technology, such as glasses, gloves, watches, clothing and shoes. A wearable device is a portable device that is worn directly on the body or integrated into the user's clothing or accessories. Wearable device is not only a hardware device, but also realizes powerful functions through software support, data interaction, and cloud interaction. In a broad sense, wearable smart devices include those with full-featured, large-scale, complete or partial functions without relying on smart phones, such as smart watches or smart glasses, and those only focus on a certain type of application function, which need to cooperate with other devices such as smart phones, such as various smart bracelets, smart jewelry, etc. for physical sign monitoring.

In this embodiment of the present disclosure, the network device may be a device for communicating with a mobile device, and the network device may be an access point (AP) in WLAN, or a base transceiver station (BTS) in GSM or CDMA, it can also be a base station (nodeB, NB) in WCDMA, it can also be an evolved base station (evolutional node B, eNB or eNodeB) in LTE, or a relay station or access point, or in-vehicle devices, wearable devices and network device (gNB) in NR networks, or network device in the PLMN network in the future evolution or the network equipment in the NTN network, etc.

As an example and not a limitation, in this embodiment of the present disclosure, the network device may have a mobile feature, for example, the network device may be a mobile device. Optionally, the network device may be a satellite or a balloon station. For example, the satellite may be a low earth orbit (LEO) satellite, a medium earth orbit (MEO) satellite, a geostationary earth orbit (GEO) satellite, a high elliptical orbit (HEO) satellite etc. Optionally, the network device may also be a base station set in a location such as land or water.

In this embodiment of the present disclosure, a network device may provide services for a cell, and a terminal device communicates with the network device through transmission resources (for example, frequency domain resources, or spectrum resources) used by the cell, and the cell may be a cell corresponding to a network device (for example, a base station), the cell may belong to a macro base station, or it may belong to a base station corresponding to a small cell (Small cell). The small cells here may include: Metro cells, Micro cells, Pico cells, Femto cells, and the like. These small cells have the characteristics of small coverage and low transmit power, and are suitable for providing high-speed data transmission services.

Exemplarily, the communication system 100 applied in this embodiment of the present disclosure is as shown in FIG. 1A. The communication system 100 may include a network device 110, and the network device 110 may be a device that communicates with a terminal device 120 (or referred to as a communication terminal, a terminal). The network device 110 may provide communication coverage for a particular geographic area, and may communicate with terminal devices located within the coverage area.

FIG. 1A exemplarily shows one network device and two terminal devices. Optionally, the communication system 100 may include multiple network devices and the coverage of each network device may include other numbers of terminal devices, which is not limited by the embodiment of the present disclosure.

Optionally, the communication system 100 may further include other network entities such as a network controller and a mobility management entity, which are not limited in this embodiment of the present disclosure.

It should be understood that, in the embodiments of the present disclosure, a device having a communication function in the network/system may be referred to as a communication device. Taking the communication system 100 shown in FIG. 1A as an example, the communication devices may include a network device 110 and a terminal device 120 with communication function, and the network device 110 and the terminal device 120 may be the specific devices described above, which will not be repeated here. The communication device may further include other devices in the communication system 100, such as other network entities such as a network controller and a mobility management entity, which are not limited in this embodiment of the present disclosure.

It should be understood that the terms "system" and "network" are often used interchangeably herein. The term "and/or" in this disclosure is only an association relationship to describe the associated objects, indicating that there can be three kinds of relationships, for example, A and/or B, it can mean the three cases of A only, both A and B and B only.

In addition, the character "/" in this document generally indicates that the related objects are an "or" relationship.

It should be understood that the "instruction" mentioned in the embodiments of the present disclosure may be a direct instruction, an indirect instruction, or an associated relationship. For example, if A indicates B, it can mean that A directly indicates B, for example, B can be obtained through A; it can also indicate that A indicates B indirectly, such as A indicates C, and B can be obtained through C; it can also indicate that there is an associated relationship between A and B.

In the description of the embodiments of the present disclosure, the term "corresponding" may indicate that there is a direct or indirect corresponding relationship between the two, or may indicate that there is an associated relationship between the two, or a relationship of instructing and being instructed, configuring and being configured, etc.

Before the detailed introduction of the resource configuration method provided by the embodiment of the present disclosure, the communication technology involved in the embodiment of the present disclosure is introduced.

(1) New Radio Based Access to Unlicensed Spectrum (NR-U) System:

Unlicensed spectrum is the spectrum allocated by countries and regions that can be used for radio equipment communication. This spectrum is generally considered to be shared spectrum, that is, communication devices in different communication systems can use this spectrum without the need to apply for an exclusive spectrum license from the government, as long as they meet the regulatory requirements set by the country or region. In order to enable various communication systems that use unlicensed spectrum for wireless communication to coexist amicably on this spectrum, some countries or regions have stipulated regulatory requirements that must be met when using unlicensed spectrum.

For example, in some areas, communication devices follow the "listen-before-talk (LBT)" principle, that is, communication devices need to perform channel listening before transmitting signals on unlicensed spectrum channels. The communication device can transmit signals only when the channel detection result is that the channel is idle; if the channel detection result of the communication device on the channel of the unlicensed spectrum is that the channel is busy, the communication device cannot transmit signals. In order to ensure fairness, in one transmission, the duration of signal transmission by a communication device using an unlicensed spectrum channel cannot exceed the maximum channel occupation time (MCOT).

(2) Guard Band (GB) in the Carrier in the NR-U System:

The concept of resource block (resource block, RB) set is introduced in broadband resource configuration. One RB set includes a group of consecutive RBs, and one RB set corresponds to at least one listen before talk (listen before talk, LBT) bandwidth, and one LBT bandwidth includes 20 MHz. Since the network device can configure at least two RB sets for the terminal, when the network device configures at least two RB sets for the terminal, a guard band in the carrier is included between two adjacent RB sets, and the guard band in the carrier includes an integer number of RB(s).

In one case, the size of the guard band in the carrier is obtained according to the protocol. As an example, Table 1 shows the default configuration of RB sets and guard bands between two RB sets under a certain subcarrier spacing and carrier bandwidth.

TABLE 1

| SCS | 20 MHz Carrier BW | 40 MHz Carrier BW | | 60 MHz Carrier BW | | 80 MHz Carrier BW | |
|---|---|---|---|---|---|---|---|
| 15 KHz | 106 | 105-6-105 | Max. 216 | N/A | | N/A | |
| 30 KHz | 51 | 50-6-50 | Max. 106 | 50-6-50-6-50 | Max. 162 | 50-6-50-5-50-6-50 | Max. 217 |
| Alt. 1 60 KHz | 24 | [23-5-23] | Max. 51 | [23-5-23-5-23] | Max. 79 | [23-5-23-5-23-5-23] | Max. 107 |
| Alt. 2 60 KHz | [25] | [24-3-24] | Max. 51 | [24-3-25-3-24] | Max. 79 | [24-4-24-3-24-4-24] | Max. 107 |

In another case, the guard band in the carrier is obtained according to the configuration information of the network device. As an example, if a terminal is configured by a network device with N−1 guard band indication sets: $\{GB_1^{low}, GB_1^{high}\}, \ldots, \{GB_{N-1}^{low}, GB_{N-1}^{high}\}$, where the guard band is indicated according to the common carrier resource block (CRB) index, then the terminal can determine that the number of RB sets included in a cell is N, wherein, the guard band is defined according to the CRB grid, and the available PRBs in the RB set include:

RB set 1: $[RB_{start}, GB_1^{low}-1]$
RB set 2: $[GB_1^{high}+1, GB_2^{low}-1]$
...
RB set N: $[GB_{N-1}^{high}+1, RB_{end}]$ Wherein, the $RB_{start}$ and $RB_{end}$ respectively represent the indices of the start RB and the end RB of the cell, or the $RB_{start}$ and $RB_{end}$ respectively represent the indices of the start RB and the end RB of the BWP of the cell.

Hereinafter, in the following embodiments of the present disclosure, the guard band in the carrier is described with the uplink BWP of the terminal as an example.

Figure 1B:
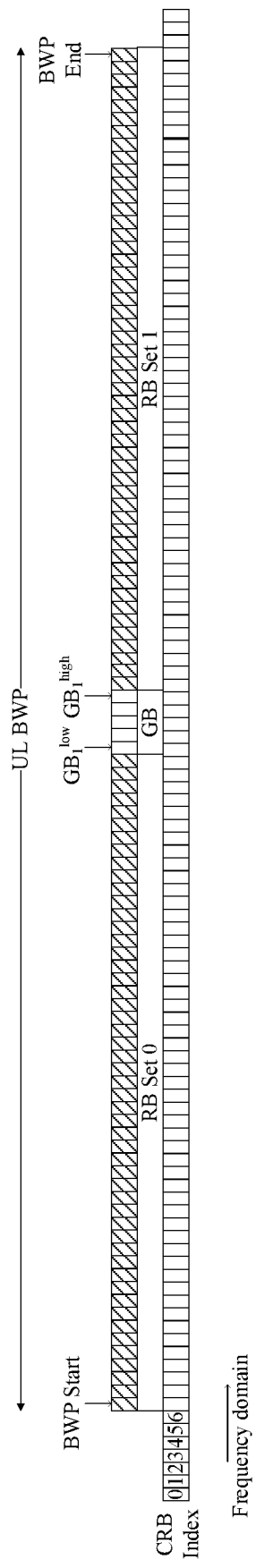
FIG. 1B is a schematic diagram of a PRACH resource in an uplink BWP provided by an embodiment of the present disclosure.

An uplink BWP may include an integer number of RB sets. Please refer to FIG. 1B. FIG. 1B provides a schematic diagram of an uplink BWP including two RB sets, and the starting position of the uplink BWP is configured based on the CRB index. Wherein, the guard band in the carrier is included between the two RB sets. The guard band can be determined according to the guard band configuration parameters of the network device $\{GB_1^{low}, GB_1^{high}\}$, or can be determined according to the protocol. If the guard band of the terminal device is configured by the network device, the start position and end position of the guard band are based on the CRB index.

In addition, in the NR-U system, a resource allocation based on interlaced structure is introduced for uplink transmission. For 15 kHz subcarrier spacing, it includes 10 interlaces (i.e. M=10), and the interlace index is 0 to 9; for 30 kHz subcarrier spacing, it includes 5 interlace (i.e. M=5), and the interlace index is 0 to 4. The definition of the interlaced structure is as follows: interlace 0 is defined according to the CRB grid starting from CRB 0, and among the RBs in each interlace, the frequency-domain interval between two adjacent RBs is M RBs.

(3) Random Access RACH Process and Configuration of PRACH Resources:

In the NR system or the NR-U system, the random access RACH process includes two cases: a four-step process and a two-step process. Among them, the delay of the four-step RACH process is relatively large. Compared with the four-step RACH process, the two-step RACH process can reduce the access delay.

For the Four-Step Process:

In the first step, the terminal sends a random access preamble sequence (message 1, Msg1) to the network device through the PRACH channel. The PRACH resource used for transmitting the PRACH may also be referred to as RO (RACH Occasion) resource.

In the second step, after detecting that a terminal sends an access preamble sequence, the network device sends a random access response (RAR, that is, message 2, Msg2) to the terminal to inform the terminal the uplink resource information can be used for sending the message 3 (Msg3), and assign a temporary TC-RNTI to the terminal, and provide the terminal with a TA command, etc.

In the third step, after receiving the random access response RAR, the terminal sends the Msg3 message in the uplink resource indicated by the random access response message.

In the fourth step, the network device sends a Msg4 message to the terminal, which may include a contention resolution message.

For the Two-Step Process:

In the first step, the terminal sends a message A (MsgA) to the base station through the PRACH channel and the PUSCH channel, where the Msg A includes a random access preamble sequence and msgA-PUSCH. The msgA-PUSCH resource used to transmit the msgA-PUSCH may also be referred to as PO (PUSCH Occasion) resource.

In the second step, after detecting MsgA, the network device sends a random access response, that is, message B (MsgB), to the terminal.

The terminal will determine the frequency domain location of the PRACH resource (also called RO resource, RACH Occasion) according to the PRACH resource frequency domain starting location configuration parameter (such as the high-level parameter msg1-FrequencyStart or msgA-RO-FrequencyStart) notified by the network device. Specifically, the frequency domain starting position configuration parameter is used to indicate the frequency domain offset of the first PRACH resource in the frequency domain in the uplink BWP (e.g., the uplink initial BWP or the uplink activated BWP) relative to the first PRB (that is, PRB 0) of the uplink BWP. The network device may also notify the number of PRACH resources of frequency division multiplexing (FDM) in the same time unit through a higher layer parameter (e.g. msg1-FDM or msgA-RO-FDM). The terminal may determine the frequency domain position of the PRACH resource included in the uplink BWP according to the frequency domain starting position configuration parameter and the number of PRACH resource FDMs.

Figure 1C:
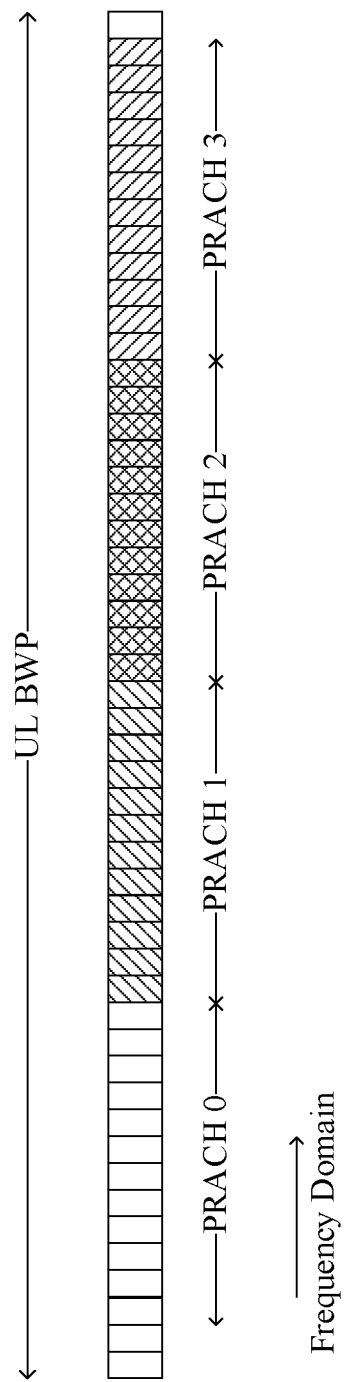
FIG. 1C is a schematic diagram of another PRACH resource in an uplink BWP provided by an embodiment of the present disclosure.

For example, on the uplink BWP, the terminal determines that the frequency domain starting position offset is 2 according to the indication information of the network device, the number of RBs occupied by one PRACH resource is 12, and the number of FDMs of the PRACH resource is 4, then the terminal can determine the four PRACH resources included in the uplink BWP are shown in FIG. 1C.

(4) PRACH Resources in the NR-U System:

Since on the shared spectrum, the unit channel bandwidth of a communication device when performing LBT can include 20 MHz, and since it is necessary to meet the index requirements of the channel occupied bandwidth when performing signal transmission, a long sequence PRACH sequence is introduced in the NR-U system. When the PRACH is 15 kHz subcarrier spacing (SCS), the length of the PRACH sequence is 1151, and when the PRACH is 30 kHz subcarrier spacing, the length of the PRACH sequence is 571.

The combination of PRACH subcarrier spacing and PUSCH subcarrier spacing supported on the shared spectrum and the number of RBs occupied by a corresponding PRACH resource are shown in Table 2 below. The number of RBs occupied by the PRACH is expressed in units of RBs of the PUSCH.

TABLE 2

| PRACH sequence length | PRACH SCS (kHz) | PUSCH SCS (kHz) | PRACH occupied RB number |
| --- | --- | --- | --- |
| 139 | 15 | 15 | 12 |
| 139 | 15 | 30 | 6 |
| 139 | 15 | 60 | 3 |
| 139 | 30 | 15 | 24 |
| 139 | 30 | 30 | 12 |
| 139 | 30 | 60 | 6 |
| 571 | 30 | 15 | 96 |
| 571 | 30 | 30 | 48 |
| 571 | 30 | 60 | 24 |
| 1151 | 15 | 15 | 96 |
| 1151 | 15 | 30 | 48 |
| 1151 | 15 | 60 | 24 |

In the NR-U system, since the guard band in the carrier is introduced, when an uplink BWP includes multiple RB sets, the uplink BWP may also include a guard band between two RB sets. Regarding the resource configuration of the existing random access procedure, it may happen that the configured resource is located in the guard band in the uplink BWP. Therefore, in the NR-U system, the resource allocation of the random access procedure needs to be further studied.

With respect to the above problems, an embodiment of the present disclosure provides a wireless communication method, which will be described in detail below with reference to the accompanying drawings. This disclosure includes at least part of the following contents.

Figure 2A:
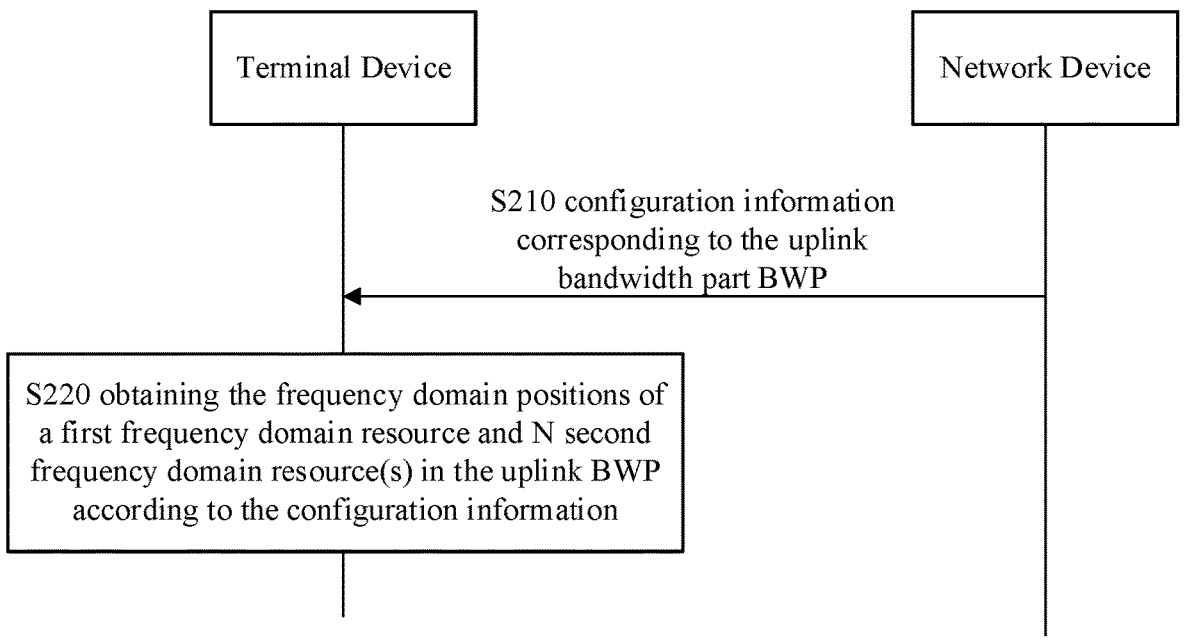
FIG. 2A is a schematic flowchart of a resource configuration method provided by an embodiment of the present disclosure.

Please refer to FIG. 2A. FIG. 2A is a schematic flowchart of a resource configuration method provided by an embodiment of the present disclosure. The method includes:

S210. The network device sends configuration information corresponding to the uplink bandwidth part BWP to the terminal device.

The uplink BWP may include at least two resource block RB sets.

Specifically, the uplink BWP may include an initial uplink BWP or an activated uplink BWP.

S220. After receiving the configuration information, the terminal device obtains the frequency domain positions of a first frequency domain resource and N second frequency domain resource(s) in the uplink BWP according to the configuration information.

The first frequency domain resource may include a first guard band between two adjacent RB sets in the at least two RB sets, and each second frequency domain resource in the N second frequency domain resources may be used to transmit a first physical uplink channel, the first physical uplink channel may include at least one of physical random access channel PRACH and message A-physical uplink shared channel msgA-PUSCH, and N is a positive integer. Optionally, N is a positive integer greater than or equal to 1. Optionally, the value of N is one of 1, 2, 4, and 8.

Specifically, the first guard band may include a guard band in the carrier.

Optionally, the first frequency domain resource includes an integer number of RBs, and/or the second frequency domain resource includes an integer number of RBs.

It can be seen that, in this embodiment, the configuration information corresponding to the uplink BWP is sent to the terminal device through the network device, and then the terminal device obtains the frequency domain positions of the first frequency domain resource and the N second frequency domain resource(s) in the uplink BWP according to the configuration. Since the uplink BWP includes a guard band between two RB sets, the frequency domain position of the first frequency domain resource with the guard band and the at least one second frequency domain resource in the uplink BWP are obtained by the configuration information, which is beneficial to realize the frequency domain resource configuration of PRACH or msgA-PUSCH, and is beneficial to avoid the transmission of PRACH or msgA-PUSCH through the guard band.

In a possible example, the method may further include the following operations: if the first frequency domain resource and the second frequency domain resource overlap in the frequency domain, the second frequency domain resource cannot be used for transmitting the first physical uplink channel; or, if the first frequency domain resource and the second frequency domain resource do not overlap in the frequency domain, the second frequency domain resource can be used for transmitting the first physical uplink channel.

In a possible example, the method may further include the following operations: if the first frequency domain resource and the second frequency domain resource overlap in the frequency domain, the second frequency domain resource is an invalid resource; or, if the first frequency domain resource and the second frequency domain resource do not overlap in the frequency domain, the second frequency domain resource is a valid resource.

In a possible example, the configuration information may include first indication information, and the first indication information may be used to indicate a frequency domain starting position in the uplink BWP, of at least one second frequency domain resource of the N second frequency domain resource(s).

In a possible example, the first indication information is used to indicate a frequency domain starting position in the uplink BWP, of each second frequency domain resource of the N second frequency domain resource(s).

In a possible example, the first indication information may be used to indicate a frequency domain starting position in the uplink BWP, of a first one of the second frequency domain resource of the N second frequency domain resource(s), wherein the first one of the second frequency domain resource may include the second frequency domain resource with lowest frequency domain position in the N second frequency domain resource(s). In a possible example, the configuration information may include second indication information, wherein the second indication information may be used to indicate that a number of the second frequency domain resource included in the uplink BWP is the N.

In a possible example, the uplink BWP may include P RB set(s), wherein P is a positive integer, and the method may further include the following operations: in a case where the N is smaller than or equal to the P, each RB set in first N RB set(s) of the P RB set(s) includes one second frequency domain resource; or, in a case where the N is greater than the P, each RB set in the P RB set(s) includes one second frequency domain resource.

In a possible example, the second indication information may be used to indicate that the number of the second frequency domain resource included in the uplink BWP is N=1, that is, the uplink BWP include one second frequency domain resource. Optionally, the first indication information may be used to indicate a frequency domain starting position in the uplink BWP of the second frequency domain resource. Optionally, the second frequency domain resource is located in one RB set of the at least two RB sets included in the uplink BWP. Optionally, the second frequency domain resource includes PRACH resources, wherein the SCS of the PRACH is 15 kHz and the length of the PRACH sequence is 1151, or the SCS of the PRACH is 30 kHz and the length of the PRACH sequence is 571.

In a possible example, when the second frequency domain resource includes PRACH resources, wherein the SCS of the PRACH is 15 kHz and the length of the PRACH sequence is 1151, or the SCS of the PRACH is 30 kHz and the length of the PRACH sequence is 571, the second indication information included in the configuration information indicates N=1 or the number of the second frequency domain resources included in the uplink BWP is N=1. Or, in this case, the terminal device expects that the number N of the second frequency domain resources included in the uplink BWP is not greater than 1. Or, in this case, the terminal device expects that the second frequency domain resource included in the uplink BWP obtained according to the first indication information is located in one RB set included in the uplink BWP. Or, in this case, the terminal device expects that no part of the frequency domain resources in the second frequency domain resources included in the uplink BWP obtained according to the first indication information is located within the first guard band included in the uplink BWP.

In a possible example, the configuration information includes third indication information, wherein the third indication information is used to indicate a frequency domain starting position in at least one RB set of the first RB set, of at least one second frequency domain resource of the N second frequency domain resource(s), and wherein the first RB set includes at least one RB set in the at least two RB sets.

In a possible example, the first RB set includes M RB set(s), and the third indication information is further used to indicate the frequency domain starting position in corresponding RB set, of a first one of the second frequency domain resource of each RB set of the M RB set(s), wherein M is a positive integer smaller than or equal to N.

In a possible example, the third indication information is further used to indicate the frequency domain starting position in a first one of the RB set, of a first one of the second frequency domain resource of the first one of the RB set, and wherein the first one of the RB set includes an RB set with smallest index in the first RB set.

In a possible example, the first RB set includes L RB set(s), wherein the frequency domain starting positions in corresponding RB set, of the first one of the second frequency domain resource of each RB set of the L RB set(s), are same, and wherein L is a positive integer smaller than or equal to N.

In a possible example, the configuration information may include fourth indication information, and the fourth indication information may be used to indicate an index of a first RB set, wherein the first RB set includes at least one of the second frequency domain resources.

In a possible example, the configuration information includes fifth indication information, and the fifth indication information is used to indicate a frequency domain position of the first frequency domain resource in the uplink BWP.

For example, the fifth indication information includes the aforementioned guard band configuration information, the fifth indication information is used to indicate the start position and the end position of the at least one guard band, or the fifth indication information is used to indicate the start position and the length of the at least one guard band.

In a possible example, each second frequency domain resource of the N second frequency domain resource(s) is located in one RB set of the at least two RB sets.

It should be noted that the present disclosure proposes a method applied in an NR-U system to avoid sending PRACH or msgA-PUSCH to a network device through an RB included in a guard band in a broadband scenario.

In this embodiment of the present disclosure, for a two-step random access procedure or a four-step random access procedure: if at least one RB corresponding to the first PRACH resource and at least one RB included in the guard band in the uplink BWP have a frequency domain overlapping, then the first PRACH resource can be considered as an invalid PRACH resource; or, the terminal device determines the frequency domain location of the PRACH resource in the uplink BWP according to the configuration parameter of the network device, wherein the PRACH resource is located in an RB set in the uplink BWP.

In the embodiment of the present disclosure, for the two-step random access process: if at least one RB corresponding to the first msgA-PUSCH resource overlaps with at least one RB included in the guard band in the uplink BWP in the frequency domain, then the first The msgA-PUSCH resource may be considered as invalid msgA-PUSCH resource; or, the terminal device determines the frequency domain location of the msgA-PUSCH resource in the uplink BWP according to the configuration parameters of the network device, wherein the msgA-PUSCH resource is located in an RB set in the uplink BWP.

The following embodiments of the present disclosure will be specifically introduced from Embodiment 1 and Embodiment 2.

Embodiment 1

The terminal device determines the guard band included in the uplink BWP according to the guard band configuration information of the network device or according to the agreement. The guard band may include a guard band in a carrier, the uplink BWP includes an initial uplink BWP or an activated uplink BWP, and the uplink BWP includes at least two RB sets.

The terminal device determines the frequency domain position of the PRACH resource in the uplink BWP according to the configuration parameters of the network device. If at least one RB corresponding to the PRACH resource and at least one RB included in the guard band in the uplink BWP are overlapped in the frequency domain, the PRACH resource may be regarded as an invalid PRACH resource, or the terminal device cannot send PRACH to the network device through the PRACH resource, or the network device does not expect the terminal device to send PRACH through the PRACH resource.

Optionally, the terminal device determines the frequency domain position of the PRACH resource (also referred to as RO, RACH Occasion or RACH transmission opportunity) according to the PRACH resource frequency domain starting position configuration parameter (for example, the high-level parameter msg1-FrequencyStart or msgA-RO-FrequencyStart) notified by the network device. Specifically, the frequency domain starting position configuration parameter is used to indicate the frequency domain offset of the first PRACH resource in the frequency domain in the uplink BWP (such as the uplink initial BWP or the uplink activated BWP) relative to the first PRB (i.e., PRB 0) of the uplink BWP. The network device may also notify the number of PRACH resources of the frequency division multiplexing FDM in the same time unit through a high layer parameter (e.g. msg1-FDM or msgA-RO-FDM). The terminal device may determine the frequency domain position of the PRACH resource included in the uplink BWP according to the frequency domain starting position configuration parameter and the number of PRACH resource FDMs.

Optionally, if the length of the PRACH sequence is 1151, or if the length of the PRACH sequence is 571, then the terminal device expects that the number of PRACH resources of the frequency division multiplexed FDM in the same time unit is 1, or the terminal device expects that configuration parameter of the network device such as msg1-FDM indicates 1 or msgA-RO-FDM indicates 1, or the terminal device does not expect that the configuration parameter of the network device such as msg1-FDM or msgA-RO-FDM indicates a value other than 1.

Optionally, if the length of the PRACH sequence is 1151, or, if the length of the PRACH sequence is 571, then the terminal device expects that the PRACH resource included in the uplink BWP, obtained according to the configuration parameters of the network device such as msg1-FrequencyStart or msgA-RO-FrequencyStart, is included in an RB set included in the uplink BWP, or, the terminal device does not expect that part of the PRACH resource included in the uplink BWP, obtained according to the configuration parameters of the network device such as msg1-FrequencyStart or msgA-RO-FrequencyStart, is located within the guard band included in the uplink BWP.

Optionally, for the two-step random access procedure, the terminal device determines the frequency domain position of the msgA-PUSCH resource in the uplink BWP according to the configuration parameters of the network device, wherein, if at least one RB corresponding to the first msgA-PUSCH resource is overlapped in the frequency domain with at least one RB included in the guard band in the uplink BWP then the first msgA-PUSCH resource may be regarded as an invalid msgA-PUSCH resource, or the terminal device cannot use the first msgA-PUSCH resource to send the msgA-PUSCH to the network device, or the network device does not expect the terminal device to send msgA-PUSCH by the first msgA-PUSCH resource.

Optionally, for the two-step random access procedure, the terminal device expects that the PRACH resource obtained according to the configuration parameters of the network device and the msgA-PUSCH resource corresponding to the PRACH resource are located in the same RB set, or the terminal device does not expect that the PRACH resource obtained according to the configuration parameters of the network device and the msgA-PUSCH resource corresponding to the PRACH resource are located in different RB sets.

Optionally, one RB set corresponds to one LBT bandwidth, or, one RB set corresponds to 20 MHz bandwidth.

Figure 2B:
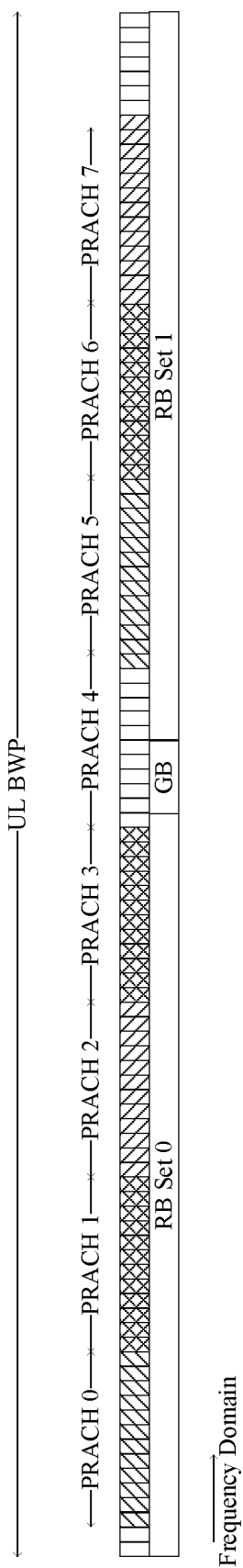
FIG. 2B is a schematic diagram of another PRACH resource in an uplink BWP provided by an embodiment of the present disclosure.

An example of Embodiment 1 is given in FIG. 2B. As shown in FIG. 2B, the uplink BWP includes 2 RB sets, wherein RB set 0 includes 51 RBs, RB set 1 includes 50 RBs, and a guard band of 5 RBs is included between the two RB sets. On the uplink BWP, the terminal device determines that the frequency domain start position offset value of the PRACH resource is 2 according to the indication information of the network device, the number of RBs allocated to one PRACH resource is 12, and the number of FDMs of the PRACH resource is 8, then the terminal device can determine the 8 PRACH resources included in the uplink BWP as shown in the figure. Since the RB corresponding to PRACH resource 4 and the RB included in the guard band in the uplink BWP overlap in the frequency domain, the PRACH resource 4 can be considered as an invalid PRACH resource, or the terminal device cannot send PRACH to the network device through the PRACH resource 4, or the network device does not expect the terminal device to send PRACH through the PRACH resource 4.

The above embodiment describes that the terminal device determines the frequency domain starting position of the PRACH resource or the msgA-PUSCH resource according to the indication information of the network device, and in some cases, the PRACH resource or the msgA-PUSCH resource may be located in the guard band included in the uplink BWP. The following embodiment 2 specifically introduces that the network device uses the indication information to avoid PRACH resources or msgA-PUSCH resources from being located in the guard band included in the uplink BWP.

Embodiment 2

The terminal device determines the guard band included in the uplink BWP according to the guard band configuration information of the network device or according to the agreement. The guard band may include a guard band within a carrier, the uplink BWP includes an initial uplink BWP or an activated uplink BWP, and the uplink BWP includes at least two RB sets.

The terminal device determines the frequency domain location of the PRACH resource in the uplink BWP according to the configuration information of the network device, where the PRACH resource is located in an RB set in the uplink BWP, or in other words, the terminal device does not expect the RB corresponding to the determined PRACH resource overlaps in the frequency domain with the RB included in the guard band in the uplink BWP.

Optionally, the configuration information of the network device includes RB set indication information corresponding to the PRACH resource.

For example, when the network device configures the PRACH resource, the configuration parameter includes the first RB set index rb-SetIndex.

Optionally, the frequency domain offset in the frequency domain, of the first one of PRACH resource in the RB set including the PRACH resource relative to the first PRB (i.e., PRB 0) in the RB set, is obtained according to a preset rule. For example, the frequency domain offset is agreed by the protocol as 1.

Optionally, the network device configures first frequency domain starting position indication information, wherein the first frequency domain starting position indication information is used to indicate the frequency domain offset of the first PRACH resource in the first RB set in the uplink BWP relative to the first PRB (i.e., PRB 0) in the first RB set.

Optionally, the first RB set is obtained according to a preset rule. For example, the first RB set includes the first one of RB set or the RB set with the smallest index in the uplink BWP. For another example, the first RB set includes each RB set in the uplink BWP, or in other words, the frequency domain offset of the first one of PRACH resources in each RB set in the uplink BWP relative to the first one of PRB of the corresponding RB set are all the same.

Optionally, when the PRACH sequence is a long sequence, the RB set including the PRACH resources may be obtained according to the number of PRACH resources frequency-division multiplexed in the same time unit.

For example, assuming that the number of PRACH resources frequency division multiplexed in the same time unit is 2, then the first 2 RB sets in the uplink BWP include PRACH resources.

Optionally, the first RB set is obtained according to RB set indication information.

Optionally, the network device configures the second frequency domain starting position indication information, the second frequency domain starting position indication information includes N pieces of frequency domain starting position indication information, and N is the number of PRACH resources frequency division multiplexed FDM in the same time unit. Optionally, N can be obtained through a high-layer parameter (e.g., msg1-FDM or msgA-RO-FDIC sent by the network device. Optionally, the N pieces of frequency domain starting position indication information are respectively used to indicate the frequency domain offset of the N PRACH resources in the uplink BWP relative to the first one of PRB (i.e. PRB 0) of the uplink BWP in the frequency domain.

Optionally, for the two-step random access process, the terminal device determines the frequency domain position of the msgA-PUSCH resource in the uplink BWP according to the configuration parameters of the network device, wherein the msgA-PUSCH resource is located in an RB set in the uplink BWP. In other words, the terminal device does not expect that the RB corresponding to the determined msgA-PUSCH resource and the RB included in the guard band in the uplink BWP overlap in the frequency domain.

Optionally, the configuration parameters of the network device include RB set indication information corresponding to the msgA-PUSCH resource.

For example, when the network device configures the msgA-PUSCH resource, the configuration parameter includes the second RB set index rb-SetIndex. Optionally, the first RB set index is the same as the second RB set index. Optionally, the first RB set index is different from the second RB set index. Optionally, one msgA-PUSCH resource may be located in one or more RB sets.

Optionally, the network device configures third frequency domain starting position indication information, wherein the third frequency domain starting position indication information is used to indicate the frequency domain offset of the first msgA-PUSCH resource in the first RB set in the uplink BWP relative to the first one of PRB (i.e., PRB 0) in the first RB set.

Optionally, the first RB set is obtained according to a preset rule. For example, the first RB set includes the first one of RB set or the RB set with the smallest index in the uplink BWP. For another example, the first RB set includes each RB set in the uplink BWP, or in other words, the frequency domain offset of the first one of msgA-PUSCH resources in each RB set in the uplink BWP relative to the first one of PRB of the corresponding RB set are all the same.

Optionally, the first RB set is obtained according to RB set indication information.

Optionally, the network device configures fourth frequency domain starting position indication information, the fourth frequency domain starting position indication information includes M pieces of frequency domain starting position indication information, and M is the number of the msgA-PUSCH resources frequency division multiplexed FDM in the same time unit. Optionally, M can be obtained through a high-level parameter (e.g., nrofMsgA-PO-FDM-r16) sent by the network device. Optionally, the M pieces of frequency domain starting position indication information are respectively used to indicate the frequency domain offset of the M msgA-PUSCH resources in the uplink BWP relative to the first one of PRB (i.e., PRB 0) of the uplink BWP.

Optionally, one RB set corresponds to one LBT bandwidth, or, one RB set corresponds to 20 MHz bandwidth.

Figure 2C:
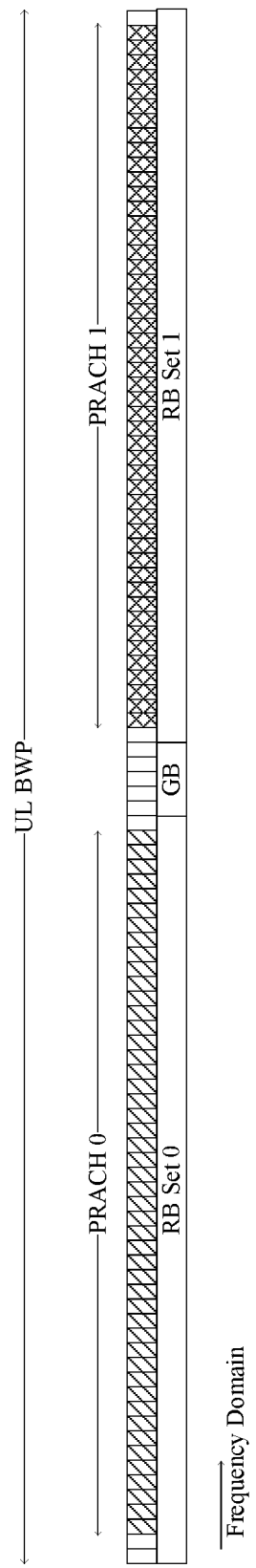
FIG. 2C is a schematic diagram of another PRACH resource in an uplink BWP provided by an embodiment of the present disclosure.

FIG. 2C takes the configuration of PRACH resources as an example to give an example of Embodiment 2. As shown in FIG. 2C, the uplink BWP includes 2 RB sets, wherein RB set 0 includes 51 RBs, RB set 1 includes 50 RBs, and a guide band of 5 RBs are included between the two RB sets. On the uplink BWP, the number of RBs allocated to one PRACH resource is 48, the uplink BWP includes two PRACH resources, and each PRACH resource is located in an RB set in the uplink BWP. Specifically, when the network device configures the PRACH resource on the uplink BWP for the terminal device, it may include at least one of the following manners:

Manner 1: The network device indicates that the RB sets including PRACH resources are RB set 0 and RB set 1, and indicates that the first frequency domain starting position is 1.

Manner 2: The network device indicates that the RB sets including PRACH resources are RB set 0 and RB set 1, and the protocol agrees that the starting position of the first frequency domain is 1.

Manner 3: The network device indicates that the number of PRACH resources frequency division multiplexed in the same time unit is 2, and the terminal device obtains according to the information that the RB sets including PRACH resources are RB set 0 and RB set 1. The starting position of the first frequency domain may be indicated or agreed by the protocol.

Manner 4: The network device indicates the frequency domain offset of the two PRACH resources in the uplink BWP relative to the first one of PRB of the uplink BWP in the frequency domain, that is, the starting position of the second frequency domain, includes 1 and 57.

Different from the technical solutions described in Embodiment 1 and Embodiment 2 above, the present disclosure also considers the situation that the terminal device may only have the capability of performing uplink transmission through one RB set, and for details, refer to Embodiment 3.

Embodiment 3

In the NR-U system, an uplink BWP (e.g., initial uplink BWP or activated uplink BWP) may include one or more RB sets, but for a terminal device, it may only have the ability to perform uplink transmission through one RB set. When the uplink BWP, e.g., the initial uplink BWP, includes multiple RB sets, the network device may allocate resources in one or more RB sets when scheduling Msg3 transmission for the terminal device. Therefore, for terminal devices with limited capabilities, such as terminal devices that only have one RB set for uplink transmission, the network device should allocate one RB set to these terminal devices instead of allocating multiple RB sets to transmit Msg3. However, in the random access procedure, the network device may not know the capability of the terminal device sending the PRACH.

Therefore, in this embodiment, the terminal device can report the capability of the terminal device to the network device through at least one of PRACH time domain resources, PRACH frequency domain resources, PRACH sequence and msgA-PUSCH, so that the network device allocates uplink transmission resources for the terminal device according to the received PRACH and/or msgA-PUSCH.

For example, the PRACH resources may include a first PRACH resource set and a second PRACH resource set, wherein the PRACH resources included in the first PRACH resource set and the second PRACH resource set are different in at least one aspect of the time domain, frequency domain, and code domain (i.e., PRACH sequence). The first PRACH resource set corresponds to the first terminal capability, for example, only supporting transmission through one RB set, and the second PRACH resource set corresponds to the second terminal capability, for example, supporting simultaneous transmission through multiple RB sets. When the terminal device has the first terminal capability, the terminal device selects PRACH resources from the first PRACH resource set for PRACH transmission; or when the terminal device has the second terminal capability, the terminal device selects PRACH resources from the second PRACH resource set resources for PRACH transmission.

Optionally, the capability reported by the terminal device includes: supporting transmission through one uplink RB set, or supporting simultaneous transmission through more than one RB set. Or, the capability reported by the terminal device includes: whether to support simultaneous transmission through multiple uplink RB sets. Or, the capability reported by the terminal device includes: the number of RB sets through which simultaneous uplink transmission is supported.

Optionally, if the capability reported to the network device by the terminal device is supporting transmission through only one uplink RB set, when the terminal device receives the RAR authorization information or the authorization information scrambled by the TC-RNTI to schedule Msg3 for the terminal device, the transmission resource corresponding to the Msg3 should be limited to one RB set, or the terminal device does not expect the transmission resource corresponding to the Msg3 to be located in multiple RB sets. Or, if the capability received by the network device reported by the terminal device is supporting transmission through only one uplink RB set, when the network device schedules Msg3 for the terminal device by the RAR authorization information or the authorization information scrambled by the TC-RNTI, the transmission resource should be limited to one RB set.

Optionally, one RB set corresponds to one LBT bandwidth, or, one RB set corresponds to 20 MHz bandwidth.

Different from the technical solutions described in Embodiment 1, Embodiment 2, and Embodiment 3 above, this disclosure also considers the case where when the terminal device is configured with interlaced uplink transmission, the network device allocates frequency domain resources to the terminal device. Specifically, see Embodiment 4 for details.

Embodiment 4

When the terminal device is configured with interlaced uplink transmission, the manner in which the network device allocates frequency domain resources to the terminal device includes the followings: if the uplink BWP includes multiple RB sets, for the interlaced PUSCH transmission on the uplink BWP, the frequency domain resource allocation (FDRA) in the grant information for the frequency domain resource allocation of the PUSCH may include X+Y bits, wherein the X bits are used to indicate the allocated interlace index, and the Y bits are used to indicate which RB set or sets in the uplink BWP is allocated to the terminal device. However, in the random access process, when the network device allocates PUSCH resources for transmitting Msg3 for the terminal device by the RAR authorization information or the authorization information scrambled by the TC-RNTI, the grant information may only include X bits for indicating the a allocated interlace index while does not include the Y-bit information used to indicate the RB set in the uplink BWP.

In this case, a possible implementation manner is that the terminal device may assume that the interlace index indicated by the X bit in all RB sets included in the uplink BWP is allocated to it for Msg3 transmission, and the terminal device may perform channel detection on channels corresponding to all RB sets included in the uplink BWP, and transmit the Msg3 to the network device through all RB sets after the channels corresponding to all RB sets are detected to be idle.

In this case, another possible implementation manner is that the terminal device may assume that the interlace index indicated by the X bit in all RB sets included in the uplink BWP is allocated to it for Msg3 transmission, and the terminal device may perform channel detection on channels corresponding to all RB sets included in the uplink BWP, and transmit the Msg3 to the network device through a RB set that is detected as being idle. Optionally, if the terminal device detects that the channels corresponding to multiple RB sets included in the uplink BWP are idle during the channel detection process, then the terminal device can determine, according to preset rules, an RB set for transmitting Msg3, such as the RB set with the smallest index from the RB set corresponding to idle channels, or the terminal device may select an RB set for transmitting Msg3 by itself. In this way, the terminal device can have a higher channel access probability when transmitting Msg3. Correspondingly, the network device can determine the RB set used by the terminal device to send the Msg3 by performing blind detection on the RB set included in the uplink BWP. Optionally, the network device may perform blind detection of Msg3 according to the ascending order of the RB set indices.

Optionally, one RB set corresponds to one LBT bandwidth, or, one RB set corresponds to 20 MHz bandwidth.

Different from the technical solutions described in Embodiment 1, Embodiment 2, Embodiment 3 and Embodiment 4 above, this disclosure also considers the case that when the uplink BWP includes one RB set, the network device configures PRACH resources and/or msgA-PUSCH resource for the terminal device, see Embodiment 5 for details.

Embodiment 5

The network device sends configuration information corresponding to the uplink bandwidth part BWP to the terminal device, wherein the uplink BWP includes a resource block RB set. The uplink BWP may include an initial uplink BWP or an activated uplink BWP. After receiving the configuration information, the terminal device obtains the frequency domain positions of the N second frequency domain resources in the uplink BWP according to the configuration information.

Each of the N second frequency domain resources may be used to transmit a first physical uplink channel, and the first physical uplink channel may include at least one of a physical random access channel PRACH and a message A-physical uplink shared channel msgA-PUSCH, N is a positive integer. Optionally, N is a positive integer greater than or equal to 1. Optionally, the value of N is one of 1, 2, 4, and 8.

Optionally, the first frequency domain resource includes an integer number of RBs, and/or the second frequency domain resource includes an integer number of RBs.

In a possible example, the configuration information may include first indication information, and the first indication information may be used to indicate a frequency domain starting position in the uplink BWP of at least one second frequency domain resource of the N second frequency domain resources.

In a possible example, the configuration information may include second indication information, and the second indication information may be used to indicate that the number of second frequency domain resources included in the uplink BWP is N.

In a possible example, the second indication information may be used to indicate that the number of the second frequency domain resources included in the uplink BWP N=1, that is, the uplink BWP includes one second frequency domain resource. Optionally, the first indication information may be used to indicate a frequency domain starting position of the second frequency domain resource in the uplink BWP. Optionally, the second frequency domain resource includes PRACH resources, wherein the SCS of the PRACH is 15 kHz and the length of the PRACH sequence is 1151, or the SCS of the PRACH is 30 kHz and the length of the PRACH sequence is 571.

In a possible example, when the second frequency domain resource includes PRACH resources, wherein the SCS of the PRACH is 15 kHz and the length of the PRACH sequence is 1151, or the SCS of the PRACH is 30 kHz and the length of the PRACH sequence is 571, the second indication information included in the configuration information indicates N=1 or the number of the second frequency domain resources included in the uplink BWP N=1. Or, in this case, the terminal device does not expect that the number N of the second frequency domain resources included in the uplink BWP is greater than 1.

Optionally, the terminal device determines the frequency domain position of the PRACH resource (also referred to as RO, RACH Occasion or RACH transmission opportunity) according to the PRACH resource frequency domain starting position configuration parameter (for example, the high-level parameter msg1-FrequencyStart or msgA-RO-FrequencyStart) notified by the network device. Specifically, the frequency domain starting position configuration parameter is used to indicate the frequency domain offset of the first PRACH resource in the frequency domain in the uplink BWP (such as the uplink initial BWP or the uplink activated BWP) relative to the first PRB (i.e., PRB 0) of the uplink BWP. The network device may also notify the number of PRACH resources of the frequency division multiplexing FDM in the same time unit through a high layer parameter (e.g. msg1-FDM or msgA-RO-FDM). The terminal device may determine the frequency domain position of the PRACH resource included in the uplink BWP according to the frequency domain starting position configuration parameter and the number of PRACH resource FDMs.

Optionally, if the length of the PRACH sequence is 1151, or if the length of the PRACH sequence is 571, then the terminal device expects that the number of PRACH resources of the frequency division multiplexed FDM in the same time unit is 1, or the terminal device expects that configuration parameter of the network device such as msg1-FDM indicates 1 or msgA-RO-FDM indicates 1, or the terminal device does not expect that the configuration parameter of the network device such as msg1-FDM or msgA-RO-FDM indicates a value other than 1.

The foregoing mainly introduces the solutions of the embodiments of the present disclosure from the perspective of interaction between various network elements on the method side. It can be understood that, in order to implement the above-mentioned functions, the terminal device and the network device include corresponding hardware structures and/or software modules for executing each function. Those skilled in the art should easily realize that the present disclosure can be implemented in hardware or a combination of hardware and computer software with the units and algorithm steps of each example described in conjunction with the embodiments disclosed herein. Whether a function is performed by hardware or computer software driving hardware depends on the specific application and design constraints of the technical solution. Skilled artisans may implement the described functionality using different methods for each particular application, but such implementations should not be considered beyond the scope of this disclosure.

In this embodiment of the present disclosure, the terminal device and the network device may be divided into functional units according to the foregoing method examples.

For example, each functional unit may be divided corresponding to each function, or two or more functions may be integrated into one processing unit. The above-mentioned integrated units can be implemented in the form of hardware, and can also be implemented in the form of software program modules. It should be noted that the division of units in the embodiments of the present disclosure is illustrative, and is only a logical function division, and other division methods may be used in actual implementation.

Figure 3:
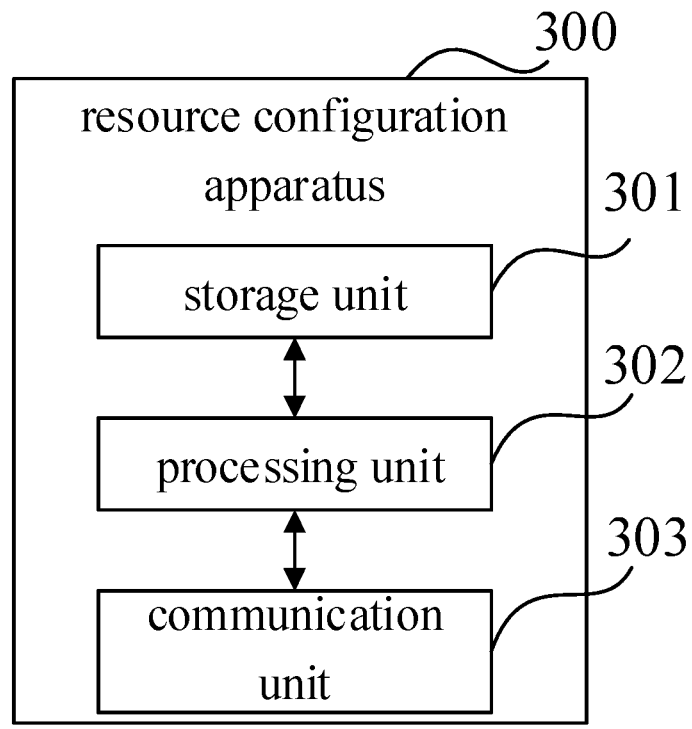
FIG. 3 is a block diagram of functional units of a resource configuration apparatus provided by an embodiment of the present disclosure.

In the case of using integrated units, FIG. 3 shows a block diagram of functional units of a resource configuration apparatus. The resource configuration apparatus 300 is applied to a terminal device, and specifically includes: a processing unit 302 and a communication unit 303. The processing unit 302 is used to control and manage the actions of the terminal device, e.g., the processing unit 302 is used to support the terminal device to perform step 210 in FIG. 2A and other processes for the techniques described herein. The communication unit 303 is used to support the communication between the terminal device and other devices. The resource configuration apparatus 300 may further include a storage unit 301 for storing program codes and data of the terminal device.

The processing unit 302 may be a processor or a controller, for example, a central processing unit (CPU), a general-purpose processor, a digital signal processor (DSP), an application-specific integrated circuit (ASIC), a field programmable gate array (FPGA), or other programmable logic devices, transistor logic devices, hardware components, or any combination thereof. It may implement or execute the various exemplary logical blocks, modules and circuits described in connection with this disclosure. The processor may also be a combination that implements computing functions, such as a combination of one or more microprocessors, a combination of a DSP and a microprocessor, and the like. The communication unit 303 may be a communication interface, a transceiver, a transceiver circuit, etc., and the storage unit 301 may be a memory. When the processing unit 302 is a processor, the communication unit 303 is a communication interface, and the storage unit 301 is a memory, the terminal device involved in the embodiment of the present disclosure may be the terminal device shown in FIG. 3.

In specific implementation, the processing unit 302 is configured to perform any step performed by the terminal device in the above method embodiments, and when performing data transmission such as transmitting, the communication unit 303 can be selectively invoked to complete corresponding operations. A detailed description will be given below.

The processing unit 302 is configured to: receive configuration information corresponding to the uplink bandwidth part BWP sent by a network device, wherein the uplink BWP includes at least two resource block RB sets; and obtain, according to the configuration information, frequency domain positions of a first frequency domain resource and N second frequency domain resource(s) in the uplink BWP, wherein the first frequency domain resource includes a first guard band between two adjacent RB sets in the at least two RB sets, each second frequency domain resource in the N second frequency domain resource(s) is used to transmit a first physical uplink channel, the first physical uplink channel includes at least one of physical random access channel PRACH and message A-physical uplink shared channel msgA-PUSCH, and N is a positive integer.

It can be seen that, in this embodiment, the configuration information corresponding to the uplink BWP is sent to the terminal device through the network device, and then the terminal device obtains the frequency domain positions of the first frequency domain resource and the N second frequency domain resource(s) in the uplink BWP according to the configuration. Since the uplink BWP includes a guard band between two RB sets, the frequency domain position of the first frequency domain resource with the guard band and the frequency domain position of at least one second frequency domain resource in the uplink BWP are obtained by the configuration information, which is beneficial to realize the frequency domain resource configuration of PRACH or msgA-PUSCH, and to avoid the transmission of PRACH or msgA-PUSCH through the guard band.

It can be understood that, since the method embodiment and the device embodiment are different presentation forms of the same technical concept, the content of the method embodiment part in this disclosure should be synchronously adapted to the device embodiment part, and will not be repeated here.

Figure 4:
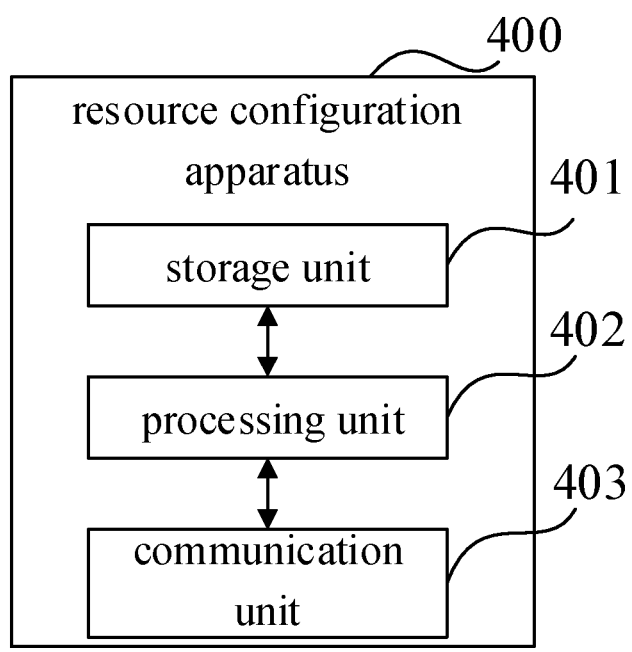
FIG. 4 is a block diagram of functional units of another resource configuration apparatus provided by an embodiment of the present disclosure.

In the case of using integrated units, FIG. 4 shows a block diagram of functional units of another resource configuration apparatus. The resource configuration apparatus 400 is applied to network equipment, and the resource configuration apparatus 400 includes: a processing unit 402 and a communication unit 403. The processing unit 402 is used to control and manage the actions of the network device, e.g., the processing unit 402 is used to support the network device to perform step 210 in FIG. 2A and/or other processes for the techniques described herein. The communication unit 403 is used to support the communication between the network device and other devices. The network device may further include a storage unit 401 for storing program codes and data of the network device.

The processing unit 402 may be a processor or a controller, such as a CPU, a general-purpose processor, a DSP, an application-specific integrated circuit, an ASIC, an FPGA, or other programmable logic devices, transistor logic devices, hardware components, or any combination thereof. It may implement or execute the various exemplary logical blocks, modules and circuits described in connection with this disclosure. The processor 402 may also be a combination that implements computing functions, such as a combination of one or more microprocessors, a combination of a DSP and a microprocessor, and the like. The communication unit 403 may be a communication interface, a transceiver, a transceiver circuit, etc., and the storage unit 401 may be a memory. When the processing unit 402 is a processor, the communication unit 403 is a communication interface, and the storage unit 401 is a memory, the network device involved in the embodiment of the present disclosure may be the network device shown in FIG. 4.

The processing unit 402 is configured to: send configuration information corresponding to the uplink bandwidth part BWP to the terminal device, where the uplink BWP includes at least two resource block RB sets.

It can be seen that, in this embodiment, the configuration information corresponding to the uplink BWP is sent to the terminal device through the network device, and then the terminal device obtains the frequency domain positions of the first frequency domain resource and the N second frequency domain resource(s) in the uplink BWP according to the configuration, which is beneficial to realize the frequency domain resource configuration of PRACH or msgA-PUSCH, and to avoid the transmission of PRACH or msgA-PUSCH through the guard band.

It can be understood that, since the method embodiment and the device embodiment are different presentation forms of the same technical concept, the content of the method embodiment part in this disclosure should be synchronously adapted to the device embodiment part, and will not be repeated here.

Figure 5:
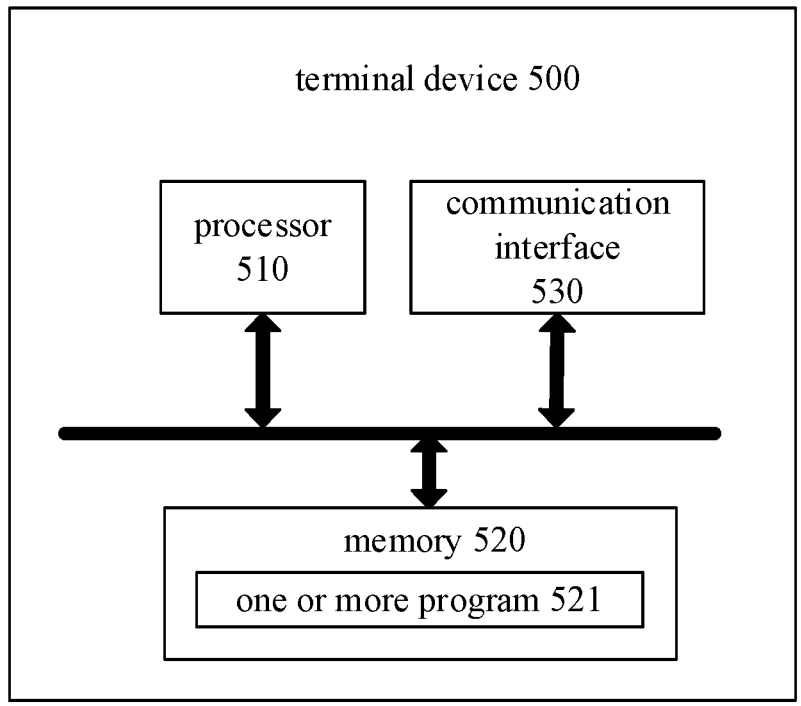
FIG. 5 is a schematic structural diagram of a terminal device provided by an embodiment of the present disclosure.

Please refer to FIG. 5. FIG. 5 is a schematic structural diagram of a terminal device provided by an embodiment of the present disclosure. The terminal device 500 includes a processor 510, a memory 520, a communication interface 530 and at least one communication bus for connecting the processor 510, the memory 520, and the communication interface 530.

The memory 520 includes, but is not limited to, random access memory (RAM), read-only memory (ROM), erasable programmable read only memory (EPROM), or compact disc read-only memory (CD-ROM), and the memory 520 is used for related instructions and data.

Communication interface 530 is used to receive and transmit data.

The processor 510 may be one or more central processing units (CPU). In the case where the processor 510 is a CPU, the CPU may be a single-core CPU or a multi-core CPU.

The processor 510 in the terminal device 500 is configured to read one or more program codes 521 stored in the memory 520, and perform the following operations: receiving configuration information corresponding to the uplink bandwidth part BWP sent by a network device, wherein the uplink BWP includes at least two resource block RB sets; and obtaining, according to the configuration information, frequency domain positions of a first frequency domain resource and N second frequency domain resource(s) in the uplink BWP, wherein the first frequency domain resource includes a first guard band between two adjacent RB sets in the at least two RB sets, each second frequency domain resource in the N second frequency domain resource(s) is used to transmit a first physical uplink channel, the first physical uplink channel includes at least one of physical random access channel PRACH and message A-physical uplink shared channel msgA-PUSCH, and N is a positive integer.

It should be noted that, the implementation of each operation may also correspond to the corresponding description with reference to the method embodiment shown in FIG. 2A, and the terminal device 500 may be used to execute the method on the terminal device side of the foregoing method embodiments of the present disclosure.

In the terminal 500 described in FIG. 5, the configuration information corresponding to the uplink BWP is sent to the terminal device through the network device, and then the terminal device obtains the frequency domain positions of the first frequency domain resource and the N second frequency domain resource(s) in the uplink BWP according to the configuration. Since the uplink BWP includes a guard band between two RB sets, the frequency domain position of the first frequency domain resource with the guard band and the frequency domain position of at least one second frequency domain resource in the uplink BWP are obtained by the configuration information, which is beneficial to realize the frequency domain resource configuration of PRACH or msgA-PUSCH, and to avoid the transmission of PRACH or msgA-PUSCH through the guard band.

Figure 6:
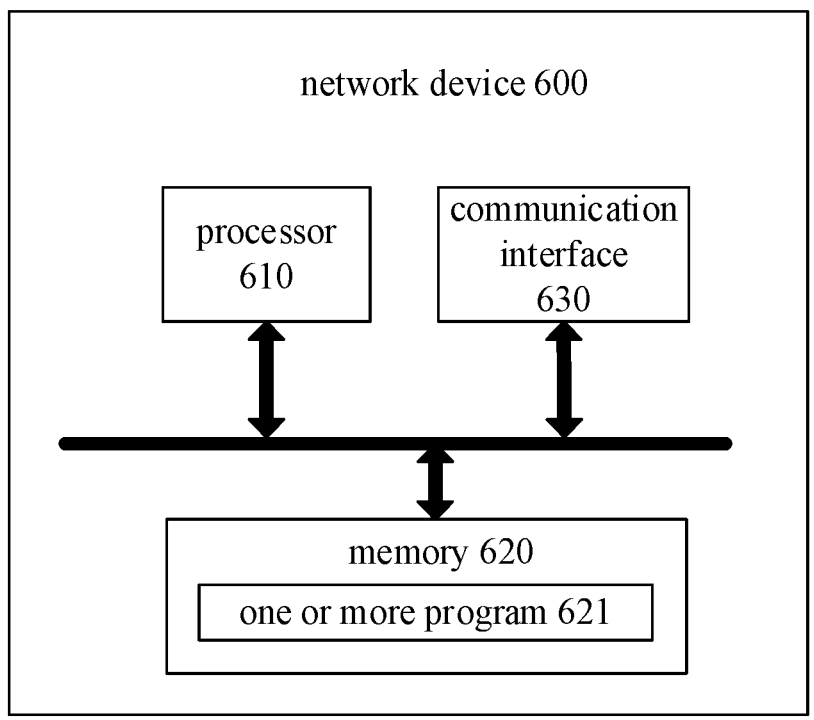
FIG. 6 is a schematic structural diagram of a network device provided by an embodiment of the present disclosure.

Please refer to FIG. 6. FIG. 6 is a schematic structural diagram of a network device provided by an embodiment of the present disclosure. The network device 600 includes a processor 610, a memory 620, a communication interface 630 and at least one communication bus for connecting the processor 610, the memory 620, and the communication interface 630.

The memory 620 includes, but is not limited to, random access memory (RAM), read-only memory (ROM), erasable programmable read only memory (EPROM), or compact disc read-only memory (CD-ROM), the memory 620 is used for related instructions and data.

Communication interface 630 is used to receive and transmit data.

The processor 610 may be one or more central processing units (CPU). In the case where the processor 610 is a CPU, the CPU may be a single-core CPU or a multi-core CPU.

The processor 610 in the network device 600 is configured to read one or more program codes 621 stored in the memory 620, and perform the following operations: sending configuration information corresponding to the uplink bandwidth part BWP to the terminal device, where the uplink BWP includes at least two resource block RB sets.

It should be noted that the implementation of each operation may also correspond to the corresponding description with reference to the method embodiment shown in FIG. 2A, and the network device 600 may be used to execute the method on the network device side of the foregoing method embodiment of the present disclosure.

In the network device 600 described in FIG. 6, the configuration information corresponding to the uplink BWP is sent to the terminal device through the network device, and then the terminal device obtains the frequency domain positions of the first frequency domain resource and the N second frequency domain resource(s) in the uplink BWP according to the configuration, which is beneficial to realize the frequency domain resource configuration of PRACH or msgA-PUSCH, and to avoid the transmission of PRACH or msgA-PUSCH through the guard band.

An embodiment of the present disclosure further provides a chip, including a processor, configured to invoke and execute a computer program from a memory, to cause a device on which the chip is installed to implement all or part of the steps of the terminal device or the network device described in the above method embodiments.

An embodiment of the present disclosure further provides a computer-readable storage medium, configured to store a computer program for electronic data exchange, wherein the computer program causes a computer to implement all or part of the steps of the terminal device or the network device described in the above method embodiments.

An embodiment of the present disclosure further provides a computer program product including a computer program configured to causes a computer to implement all or part of the steps of the terminal device or the network device described in the above method embodiments. The computer program may be a software installation package.

The steps of the method or algorithm described in the embodiments of the present disclosure may be implemented in a hardware manner, or may be implemented in a manner in which a processor executes software instructions. Software instructions can be composed of corresponding software modules, and software modules can be stored in random access memory (RAM), flash memory, read only memory (ROM), erasable programmable read only memory (Erasable Programmable ROM, EPROM), Electrically Erasable Programmable Read-Only Memory (Electrically EPROM, EEPROM), registers, hard disks, removable hard disks, compact disks (CD-ROMs), or any other form of storage medium known in the art. An exemplary storage medium is coupled to the processor, such that the processor can read information from, and write information to, the storage medium. Of course, the storage medium can also be an integral part of the processor. The processor and storage medium may be in an ASIC. Alternatively, the ASIC can be located in the terminal device or in the network device. Of course, the processor and the storage medium may also exist in the terminal device or the network device as discrete components.

Those skilled in the art should realize that, in one or more of the above examples, the functions described in the embodiments of the present disclosure may be implemented in whole or in part by software, hardware, firmware, or any combination thereof. When implemented in software, it can be implemented in whole or in part in the form of a computer program product. The computer program product includes one or more computer instructions. When the computer program instructions are loaded and executed on a computer, all or part of the processes or functions described in the embodiments of the present disclosure are generated. The computer may be a general purpose computer, a special purpose computer, a computer network, or other programmable device. Computer instructions may be stored in or transmitted from one computer-readable storage medium to another computer-readable storage medium, for example, the computer instructions may be transmitted from a website site, computer, server, or data center to another website site, computer, server or data center by a wired (e.g., coaxial cable, optical fiber, digital subscriber line (DSL)) or wireless (e.g., infrared, wireless, microwave, etc.) manner. The computer-readable storage medium may be any available medium that can be accessed by a computer or a data storage device such as a server, data center, etc. that includes an integration of one or more available media. The available media may be magnetic media (e.g., floppy disks, hard disks, magnetic tapes), optical media (e.g., digital video disc (DVD)), or semiconductor media (e.g., solid state disk (SSD)), or the like.

The specific embodiments described above further describe in detail the purposes, technical solutions and beneficial effects of the embodiments of the present disclosure. It should be understood that the above descriptions are only specific implementations of the embodiments of the present disclosure, and are not intended to be used for The protection scope of the embodiments of the present disclosure is limited, and any modifications, equivalent replacements, improvements, etc. made on the basis of the technical solutions of the embodiments of the present disclosure should be included within the protection scope of the embodiments of the present disclosure.

What is claimed is:

1. A method for resource configuration, comprising:
receiving, by a terminal device, configuration information corresponding to an uplink bandwidth part (BWP) sent by a network device, wherein the uplink BWP includes at least two resource block (RB) sets; and
obtaining, by the terminal device according to the configuration information, frequency domain positions of a first frequency domain resource and N second frequency domain resource(s) in the uplink BWP, wherein the first frequency domain resource comprises a first guard band between two adjacent RB sets in the at least two RB sets, each second frequency domain resource in the N second frequency domain resource(s) is used to transmit a first physical uplink channel, the first physical uplink channel comprises at least one of physical random access channel (PRACH) and message A-physical uplink shared channel (msgA-PUSCH), and N is a positive integer,
wherein the configuration information comprises second indication information, and wherein the second indication information is used to indicate that a number of the second frequency domain resource comprised in the uplink BWP is the N; and
wherein the uplink BWP comprises P RB set(s), wherein P is a positive integer, and the method further comprises:
in a case where the N is smaller than or equal to the P, each RB set in first N RB set(s) of the P RB set(s) comprises one second frequency domain resource; or,
in a case where the N is greater than the P, each RB set in the P RB set(s) comprises one second frequency domain resource.

2. The method according to claim 1, wherein the configuration information comprises first indication information, and wherein the first indication information is used to indicate a frequency domain starting position in the uplink BWP, of at least one second frequency domain resource of the N second frequency domain resource(s); and
wherein the first indication information is used to indicate a frequency domain starting position in the uplink BWP, of a first one of the second frequency domain resource of the N second frequency domain resource (s), and wherein the first one of the second frequency domain resource comprises the second frequency domain resource with lowest frequency domain position in the N second frequency domain resource(s).

3. The method according to claim 2, wherein the first indication information is used to indicate a frequency domain starting position in the uplink BWP, of each second frequency domain resource of the N second frequency domain resource(s).

4. The method according to claim 1, wherein the configuration information comprises third indication information, wherein the third indication information is used to indicate a frequency domain starting position in at least one RB set of a first RB set, of at least one second frequency domain resource of the N second frequency domain resource(s), and wherein the first RB set comprises at least one RB set in the at least two RB sets.

5. The method according to claim 4, wherein the third indication information is used to indicate the frequency domain starting position in a first one of the RB set, of a first one of the second frequency domain resource of the first one of the RB set, and wherein the first one of the RB set comprises an RB set with smallest index in the first RB set.

6. The method according to claim 5, wherein the first RB set comprises L RB set(s), wherein the frequency domain starting positions in corresponding RB set, of the first one of the second frequency domain resource of each RB set of the L RB set(s), are same, and wherein L is a positive integer smaller than or equal to N.

7. The method according to claim 1, wherein each of the N second frequency domain resource(s) is located in one RB set of the at least two RB sets.

8. A method for resource configuration, comprising:
transmitting, by a network device, configuration information corresponding to an uplink bandwidth part (BWP) to a terminal device, wherein the uplink BWP comprises at least two resource block (RB) sets,
wherein the uplink BWP comprises frequency domain positions of a first frequency domain resource and N second frequency domain resource(s), and wherein the first frequency domain resource comprises a first guard band between two adjacent RB sets in the at least two RB sets, each second frequency domain resource in the N second frequency domain resource(s) is used to transmit a first physical uplink channel, the first physical uplink channel comprises at least one of physical random access channel (PRACH) and message A-physical uplink shared channel (msgA-PUSCH), and N is a positive integer,
wherein the configuration information comprises second indication information, and wherein the second indication information is used to indicate that a number of the second frequency domain resource comprised in the uplink BWP is the N; and
wherein the uplink BWP comprises P RB set(s), wherein P is a positive integer, and the method further comprises:
in a case where the N is smaller than or equal to the P, each RB set in first N RB set(s) of the P RB set(s) comprises one second frequency domain resource; or,
in a case where the N is greater than the P, each RB set in the P RB set(s) comprises one second frequency domain resource.

9. The method according to claim 8, wherein the configuration information comprises first indication information, and wherein the first indication information is used to indicate a frequency domain starting position in the uplink BWP, of at least one second frequency domain resource of the N second frequency domain resource(s); and wherein the first indication information is used to indicate a frequency domain starting position in the uplink BWP, of a first one of the second frequency domain resource of the N second frequency domain resource(s), and wherein the first one of the second frequency domain resource comprises the second frequency domain resource with lowest frequency domain position in the N second frequency domain resource(s).

10. The method according to claim 9, wherein the first indication information is used to indicate a frequency domain starting position in the uplink BWP, of each second frequency domain resource of the N second frequency domain resource(s).

11. The method according to claim 8, wherein the configuration information comprises third indication information, wherein the third indication information is used to indicate a frequency domain starting position in at least one RB set of a first RB set, of at least one second frequency domain resource of the N second frequency domain resource(s), and wherein the first RB set comprises at least one RB set in the at least two RB sets.

12. The method according to claim 11, wherein the third indication information is used to indicate the frequency domain starting position in a first one of the RB set, of a first one of the second frequency domain resource of the first one of the RB set, and wherein the first one of the RB set comprises an RB set with smallest index in the first RB set.

13. The method according to claim 12, wherein the first RB set comprises L RB set(s), wherein the frequency domain starting positions in corresponding RB set, of the first one of the second frequency domain resource of each RB set of the L RB set(s), are same, and wherein L is a positive integer smaller than or equal to N.

14. The method according to claim 8, wherein each of the N second frequency domain resource(s) is located in one RB set of the at least two RB sets.

15. A terminal device, comprising a processor, a memory, a communication interface, and one or more programs, wherein the one or more programs are stored in the memory and configured to be executed by the processor, and wherein the program comprises instructions for implementing a method for resource configuration, comprising:
  receiving, by the terminal device, configuration information corresponding to an uplink an uplink bandwidth part (BWP) sent by a network device, wherein the uplink BWP includes at least two resource block (RB) sets; and
  obtaining, by the terminal device according to the configuration information, frequency domain positions of a first frequency domain resource and N second frequency domain resource(s) in the uplink BWP, wherein the first frequency domain resource comprises a first guard band between two adjacent RB sets in the at least two RB sets, each second frequency domain resource in the N second frequency domain resource(s) is used to transmit a first physical uplink channel, the first physical uplink channel comprises at least one of physical random access channel (PRACH) and message A-physical uplink shared channel (msgA-PUSCH), and N is a positive integer,
  wherein the configuration information comprises second indication information, and wherein the second indication information is used to indicate that a number of the second frequency domain resource comprised in the uplink BWP is the N; and
  wherein the uplink BWP comprises P RB set(s), wherein P is a positive integer, and the method further comprises:
  in a case where the N is smaller than or equal to the P, each RB set in first N RB set(s) of the P RB set(s) comprises one second frequency domain resource; or,
  in a case where the N is greater than the P, each RB set in the P RB set(s) comprises one second frequency domain resource.

16. The terminal device according to claim 15, wherein the configuration information comprises first indication information, and wherein the first indication information is used to indicate a frequency domain starting position in the uplink BWP, of at least one second frequency domain resource of the N second frequency domain resource(s); and
  wherein the first indication information is used to indicate a frequency domain starting position in the uplink BWP, of a first one of the second frequency domain resource of the N second frequency domain resource(s), and wherein the first one of the second frequency domain resource comprises the second frequency domain resource with lowest frequency domain position in the N second frequency domain resource(s).

17. The terminal device according to claim 16, wherein the first indication information is used to indicate a frequency domain starting position in the uplink BWP, of each second frequency domain resource of the N second frequency domain resource(s).

18. A network device, comprising a processor, a memory, a communication interface, and one or more programs, wherein the one or more programs are stored in the memory and configured to be executed by the processor, and wherein the program comprises instructions for implementing a method for resource configuration, comprising:
  transmitting, by the network device, configuration information corresponding to an uplink bandwidth part (BWP) to a terminal device, wherein the uplink BWP comprises at least two resource block (RB) sets,
  wherein the uplink BWP comprises frequency domain positions of a first frequency domain resource and N second frequency domain resource(s), and wherein the first frequency domain resource comprises a first guard band between two adjacent RB sets in the at least two RB sets, each second frequency domain resource in the N second frequency domain resource(s) is used to transmit a first physical uplink channel, the first physical uplink channel comprises at least one of physical random access channel (PRACH) and message A-physical uplink shared channel (msgA-PUSCH), and N is a positive integer,
  wherein the configuration information comprises second indication information, and wherein the second indication information is used to indicate that a number of the second frequency domain resource comprised in the uplink BWP is the N; and
  wherein the uplink BWP comprises P RB set(s), wherein P is a positive integer, and the method further comprises:
  in a case where the N is smaller than or equal to the P, each RB set in first N RB set(s) of the P RB set(s) comprises one second frequency domain resource; or,
  in a case where the N is greater than the P, each RB set in the P RB set(s) comprises one second frequency domain resource.

* * * * *